Oct. 11, 1960

C. W. HESS

2,955,489

AUTOMATIC DRILLING MACHINE

Filed May 14, 1958

INVENTOR:
CHARLES W. HESS
BY
ATT'Y

Oct. 11, 1960 C. W. HESS 2,955,489
AUTOMATIC DRILLING MACHINE
Filed May 14, 1958 5 Sheets-Sheet 2

*INVENTOR:*
CHARLES W. HESS
BY
ATT'Y

*INVENTOR:*
CHARLES W. HESS
BY
ATT'Y

United States Patent Office 2,955,489
Patented Oct. 11, 1960

2,955,489

AUTOMATIC DRILLING MACHINE

Charles W. Hess, Chicago, Ill., assignor to Speco, Inc., Schiller Park, Ill., a corporation of Illinois Filed May 14, 1958, Ser. No. 735,253

11 Claims. (Cl. 77—32.2)

The present invention relates to automatic drilling machines and more particularly to a fully automatic, cyclicly operable, machine by which a predetermined pattern of holes may be drilled, one at a time and sequentially in a plate or other object. The drilling machine of the present invention has been designed for use primarily in connection with the drilling of holes in commercial meat grinder shear plates having a relatively large number of holes and wherein the holes are arranged in longitudinal and horizontal rows in such plates. The invention is however capable of other uses and the same may, if desired, with or without suitable modification, be employed for drilling holes in a wide variety of objects other than meat grinder shear plates, whether the holes be arranged in distinguishable rows or otherwise. Irrespective however of the particular use to which the invention may be put, the essential features of the same are at all times preserved.

Heretofore, in the manufacture of meat grinder shear plates, the practice has been to lay out the desired hole pattern on each plate individually, utilizing a template or pattern plate by means of which guided punch holes are initially formed on the upper surface of the plate. Thereafter the punched plate is slidably positioned on the work support of a conventional drill press and the various punch marks are visually brought into register with the rotating drill by sliding the work relative to the drill immediately prior to each successive descent of the drill. Such a manual process is a prolonged and tedious one and requires a certain degree of skill for its successful operation. In connection with the larger size plates having several thousand holes therein, the drilling of a single plate may require the better portion of a day's work on the part of a skilled operator. Needless to say, mistakes in misalignment are costly, particularly when they occur near the completion of drilling operations.

The present invention is designed to overcome the above-noted limitations that are attendant upon conventional manual drilling methods of forming meat grinder plates and, toward this end, it contemplates the provision of a fully automatic machine, utilizing one or more automatic drill units, and by means of which machine the various work pieces undergoing drilling are automatically moved into register with the respective drills associated with the units and are presented to such drills successively in proper positions for drilling the various holes according to a predetermined pattern of holes. In carrying out this object, the invention contemplates the provision of a battery of more or less conventional automatic drill units which are preferably of the pneumatically operable type having conventional control devices for their operation, together with a shiftable work-supporting carriage common to the various units which, under the control of a novel sensing system including pattern control templates and electrical control devices actuated thereby, is caused to automatically shift its position periodically to bring the work pieces supported thereby into proper drilling register with the respective drills of the automatic drill units. The electric control devices not only effect control of the movement of the work-supporting carriage but they also effect automatic operation of the drill units at the proper times in the machine cycle after each drill location on the various plates has been brought into accurate register with its respective rotating drill.

The provision of an automatic drilling machine of the character briefly outlined above being among the principal objects of the invention, numerous other objects and advantages of the invention, not at this time enumerated, will become more readily apparent as the following description ensues.

In the accompanying five sheets of drawings forming a part of this specification, a preferred embodiment of the invention has been shown.

In these drawings.

Figure 1:
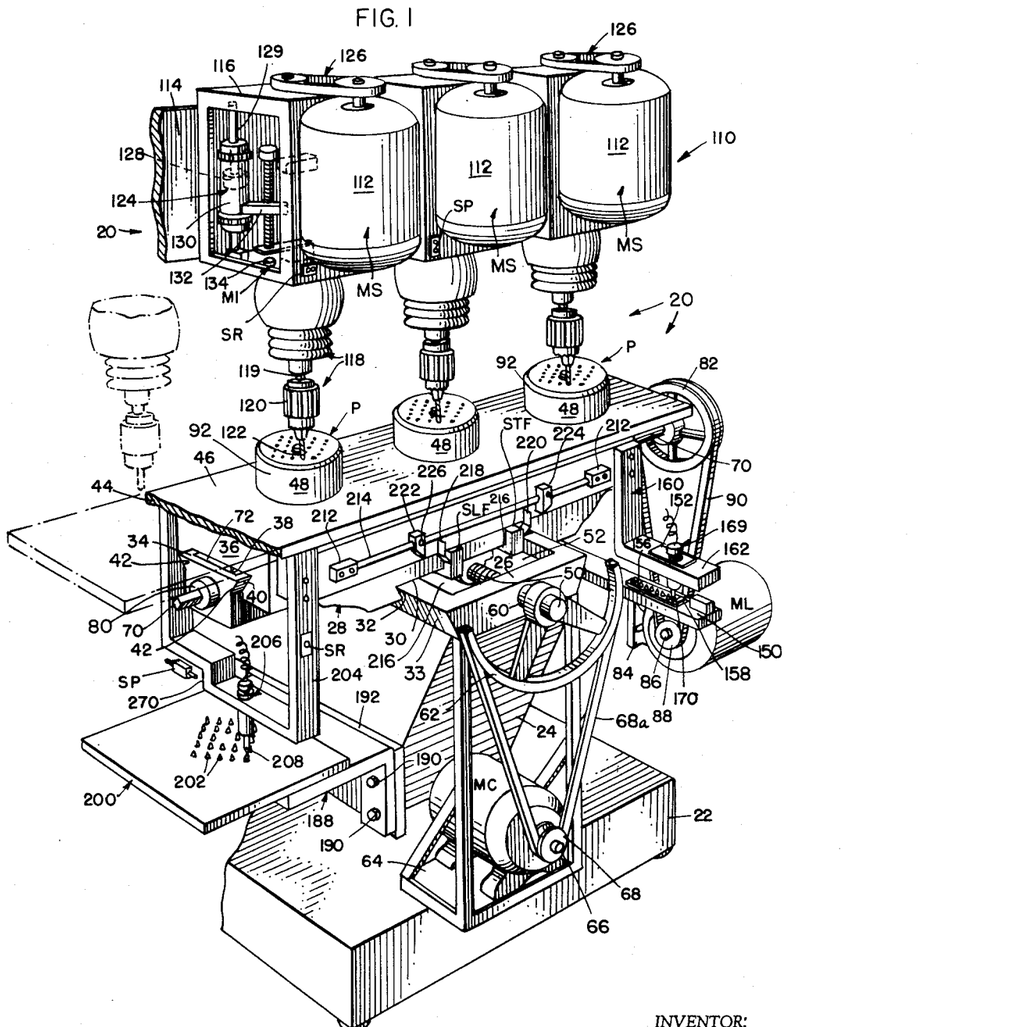
Fig. 1 is a front perspective view, partly in section, of an automatic drilling machine constructed in accordance with the principles of the present invention.
Figures 4, 6:
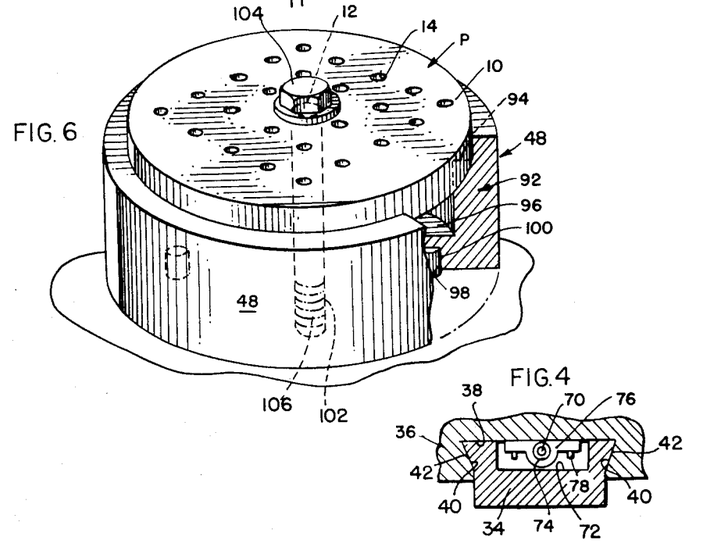
Fig. 4 is an enlarged sectional view taken substantially centrally and transversely through the machine in the vicinity of a longitudinal feed screw employed in connection with the invention.
Fig. 6 is a front perspective view of the structure shown in Fig. 5.
Figure 5:
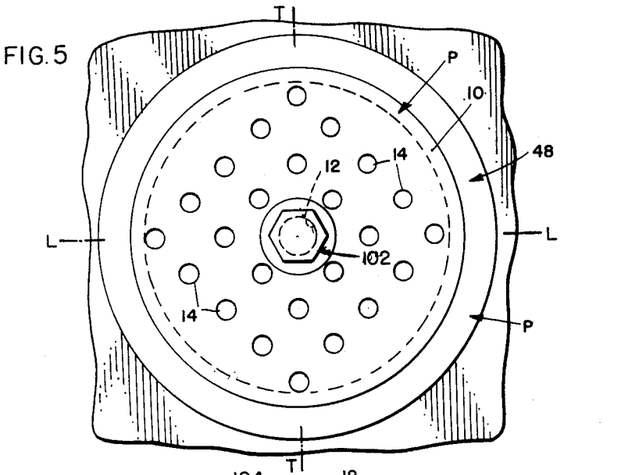
Fig. 5 is a top plan view of one of a plurality of work holders employed in connection with the invention and showing the same operatively mounted on a positionable carriage support forming a part of the machine.

Referring now to the drawings in detail, and in particular to Fig. 1, wherein an exemplary embodiment of the present invention has been illustrated in the form of an automatic drilling machine by means of which the perforations or holes associated with a plurality of circular shear plates may be simultaneously drilled in the plates in a progressive manner. Shear plates of the type with which the present invention is concerned, and which have been designated herein at P are designed for use in connection with meat grinders of the feed screw type. A grinder of this sort is comprised generally of a casing providing a cylindrical feed channel for the meat product to be ground and in which there is disposed a rotatable feed screw. One end of the feed channel is open while the other end has interposed thereacross one of the perforated shear plates P. The end of the feed screw is rotatably journalled in a central opening provided in the plate and a cutter assembly including a series of radially disposed rotary knife blades operates on the inside face of the plate shear the material as it enters the various shear openings provided in the plate. Shear plates of this character vary widely both as regards their size and the number of holes provided therein. Where commercial grinders are concerned the extremely large plates may have as many as four thousand one-sixteenth inch holes while the small plates may have fewer than one hundred one-quarter inch holes. The holes in commercial shear plates of this character are variously formed in the plates, some plates utilizing holes which extend along radial lines or rows, other utilizing concentric equally spaced circumferentially arranged holes, and still other plates having holes which are spaced at random. However to facilitate manual drilling operations, most commercial plates have holes which are arranged in longitudinal and transverse rows. The drilling operations performed by the machine of the present invention are predicated upon this latter type of circular shear plate and, as best seen in Figs. 5 and 6, wherein one of the shear plates P has been illustrated after drilling operations are complete, the plate is shown as being provided with twenty-four holes therein arranged in a square checker-board pattern with each row in two directions containing five holes, except for the two medial intersecting rows which contain only four holes due to the omission of a central shear hole. In the diagonal direction of the square pattern of holes, the holes are arranged in nine rows and, when the undrilled plate P is mounted in the machine for drilling purposes, there will be nine rows of hole locations extending both longitudinally and transversely of the machine as will be described in detail presently. Considering either the transverse direction indicated by the axis T—T in Fig. 5, or the longitudinal direction as indicated by the line L—L of Fig. 5, there is a single hole in the first row, two holes in the second row, three holes in the third row, four holes in the fourth row, four holes in the fifth row, four holes in the sixth row, three holes in the seventh row, two holes in the eighth row, and one hole in the last row. The arrangement of holes shown in Fig. 5 is purely exemplary and it will be understood that a greater or lesser number of holes may be employed and that these holes may be arranged in longitudinal and transverse rows in the direction of the axes T—T and L—L with any desired spacing or number of holes in the various rows.

The various plates P are identical in construction and each comprises a flat relatively thick circular steel plate or body 10 having a relatively large central feed screw opening 12 formed therein with the various shear holes 14 being arranged in a pattern about the central opening 12 in the manner previously outlined above.

The plates P are purely conventional and no claim is made herein to any novelty associated with the same.

Referring again to Fig. 1, the automatic drilling machine of the present invention is designated in its entirety at 20 and the same involves in its general organization a baseplate or block 22 on which there is supported a supporting structure or base framework 24, the upper end of which carries a transversely extending dovetail guide block 26 which constitutes a stationary portion of the machine framework and on which guide block there is slidably supported for transverse movement relative to the framework a carriage assembly 28 hereinafter referred to as the transverse carriage. The underneath side of the transverse carriage 28 is formed with a transversely extending dovetail slot 30 presenting inclined side walls 32 designed for cooperation with the inclined side surfaces 33 of the dovetail guide block 26. The body portion of the transverse carriage 28 is of elongated design and has its axis extending longitudinally of the framework of the machine. The carriage 28 is provided with a dovetail block section 34 on which section there is longitudinally slidable a carriage assembly 36 hereinafter referred to as the longitudinal carriage. The carriage 36 is provided with a dovetail slot 38 having side faces 40 designed to straddle the inclined side faces 42 of the dovetail guide block 34. From the above description it will be seen that inasmuch as the transverse carriage 28 is transversely slidable upon the stationary guide block 34 and, inasmuch as the longitudinal carriage 36 is longitudinally slidable on the guide block 34, this latter carriage is capable of universal shifting movement in a horizontal plane so that it may be brought to any desired position of adjustment either longitudinally or transversely of the machine framework for purposes that will be made clear presently.

The carriage 36 is provided on the upper side thereof with a work-supporting bed plate 44 presenting an upwardly facing horizontal table surface 46 on which there are adapted to be mounted a plurality of work supports proper 48 (see also Figs. 5 and 6). The nature and function of these work supporting assemblies 48 will be set forth in detail subsequently.

In order to effect transverse movements of the carriage assembly 28, a transversely extending feed screw 50 (Figs. 1 and 3) is rotatably journalled substantially centrally in the dovetail guide block 34 and has its medial regions exposed within a rectangular socket or well portion 52 and in threaded engagement with a threaded bore 54 provided in a block member 56 which is secured by means of cap screws or the like 58 to the underneath surface of the carriage 28 within the dovetail slot 30. The front and rear ends of the feed screw 50 are rotatably journalled as at 60 in the front and rear portions of the block respectively and the forward end of the feed screw projects forwardly of the block 34 and has fixedly secured thereto a relatively large driven pulley 62. An electric motor MC operatively mounted on a platform 64 supported on the block 22 is provided with a motor shaft 66 on which there is mounted a pulley 68. A belt 68a passes around the pulleys 62 and 68 and completes the driving connection between the motor MC and feed screw 50. The motor M is of the reversible type and therefore it will be seen that upon energization of the motor MC for rotation of the shaft 66 in either direction, traversing of the carriage 28 across the machine framework in one direction or the other, as the case may be, will be effected.

Figures 2, 3, 7, 8, 9:
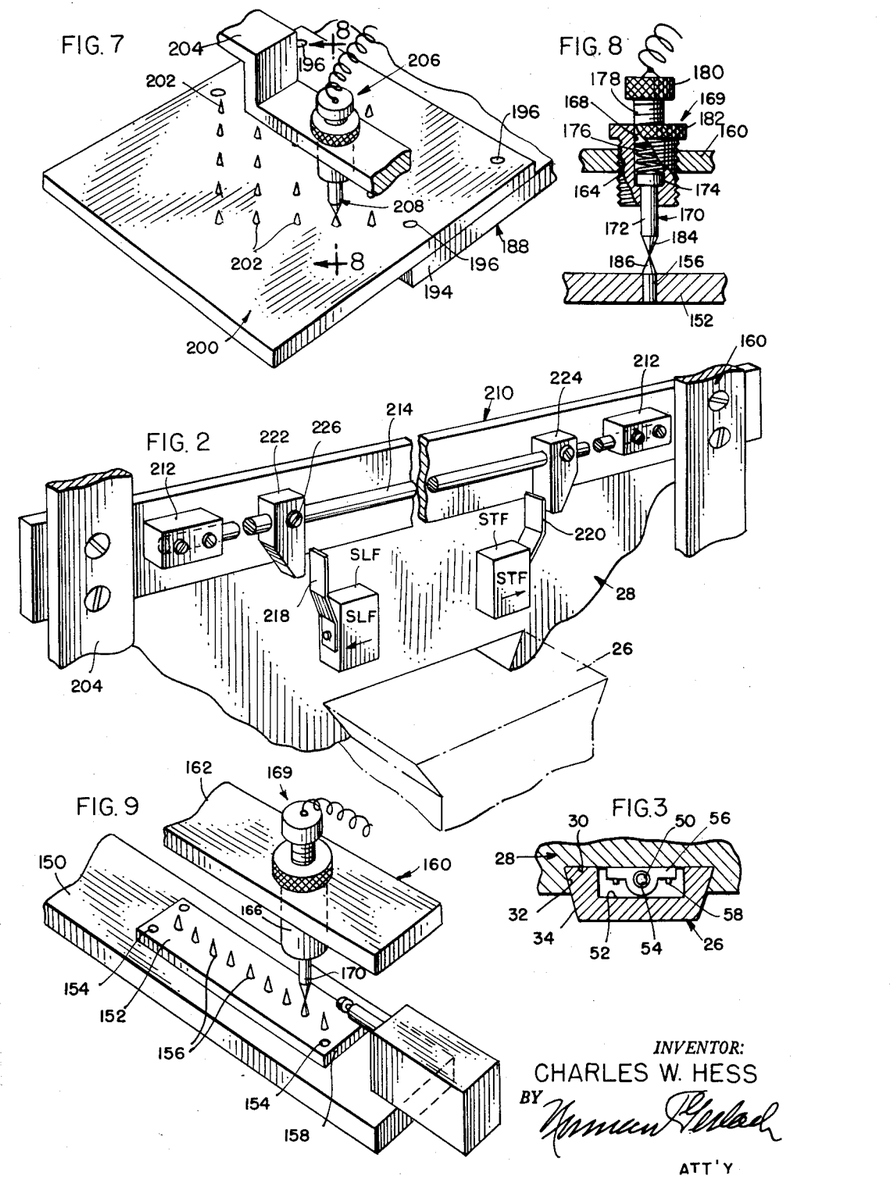
Fig. 2 is an enlarged fragmentary front perspective view of a portion of the machine shown in Fig. 1 and illustrating the location and operation of a pair of limit switches employed in connection with the invention.
Fig. 3 is an enlarged sectional view taken substantially centrally and longitudinally through the machine in the vicinity of a transverse feed screw employed in connection with the invention.
Fig. 7 is a fragmentary perspective view of a pattern sensing mechanism employed in connection with the invention and under the control of which the work supporting carriage is caused to shift its position longitudinally of the machine.
Fig. 8 is a sectional view taken substantially along the plane indicated by the line 8—8 of Fig. 7.
Fig. 9 is a fragmentary perspective view similar to Fig. 7 of a pattern sensing mechanism under the control of which the work supporting carriage is caused to shift its position transversely of the machine.

As best seen in Figs. 3 and 4, longitudinal shifting of the carriage 36 relative to the carriage 28 is effected by a feed screw and electric motor drive mechanism similar to that described in connection with the carriage 28. Accordingly, a longitudinally extending feed screw 70 is rotatably journalled in the dovetail block portion 34 of the carriage 28 and has its central threaded region exposed within a rectangular recess or socket 72 and in threaded engagement with a threaded bore 74 provided in a block 76 secured by means of cap screws 78 within the dovetail slot 38. The opposite ends of the feed screw 70 are journalled as at 80 in the ends of the block 34 and the right hand end of the shaft 70, as seen in Fig. 1, projects beyond the face of the block and carries a pulley 82. An electric motor ML is operatively mounted on a bracket 84 suitably suspended from the carriage 36 and is provided with a motor shaft 86 on which there is mounted a pulley 88. A belt 90 passes around the pulleys 82 and 88 and completes the driving connection between the motor ML and the feed screw 70. The motor ML is of the reversible type and thus it will be seen that upon energization of the motor ML for rotation of its drive shaft 80 in either direction, shifting movement of the carriage 36 relative to the carriage 28 in one direction or the other, as the case may be, will take place.

Referring now to Figs. 1, 5 and 6, the various work supports are positioned on the table surface 46 in a longitudinally extending row. In Fig. 1, three such supports have been illustrated but it will be understood that a greater or lesser number of such supports may be employed if desired, depending upon the number of plates P which are to be simultaneously drilled during each cycle of machine operation, or in other words, upon the unit capacity of the machine. Each work support is in the form of a cylindrical cup-shaped member or body 92, the upstanding cylindrical wall of which is provided with an internal annular shoulder 94 providing, in effect, a ledge upon which the peripheral regions of one of the plates P is adapted to be supported. The bottom wall 96 of the member 92 is provided with a plurality of sockets 98 therein designed for reception therein of a plurality of locating pins 100 which project upwardly from the table surface 46. In order to firmly secure the plate P in position on the shoulder or ledge 94, a clamping bolt 102 having a flanged bolt head 104 projects through the central opening 12 in the plate P and has its lower regions threaded as at 106 in the bottom wall 96.

Referring now to Fig. 1, a battery 110 of individual drill press assemblies 112 is suitably mounted on a supporting surface 114 so as to overlie the table surface 46 with each drill press assembly 112 being operatively aligned vertically with one of the work supports 48. The various drill press units 112 are identical in design and construction and each unit is of a more or less conventional commercial type of unit capable of being purchased on the open market, and which has been modified slightly as to its control characteristics to adapt the same for use in performing the drilling method of the present machine, all in a manner that will be clearly set forth in detail subsequently. It is deemed sufficient for purposes of description herein to state that each unit 112 includes a mounting and control cabinet 116 having associated therewith a spindle assembly 118, the vertically reciprocal spindle 119 of which carries the usual chuck 120 for supporting a drill 122. A fluid actuated cylinder assembly or motor 124 is operatively connected to the spindle assembly 118 for controlling the vertical raising and lowering movements of the latter while a spindle motor MS is operatively connected by a belt and pulley driving connection 126 to the spindle 119 in a manner that is well known in the art. The piston and cylinder assembly 124 is of the stationary-piston, movable-cylinder type, the piston 128 thereof being provided with a piston rod 129 secured to the top wall of the cabinet 116, and the movable cylinder 130 being provided with an arm 132 adapted to engage an actuating finger 134 associated with a microswitch MI (see also Fig. 10) mounted within the cabinet 116 in the path of movement of the arm 132, and the electrical function of which switch will be described when the nature of the electrical control instrumentalities of the present invention is described. It is deemed sufficient for the present to state that upon engagement of the finger 134 by the arm 132 when the spindle 119 is adjacent the bottom of its stroke and has completed its drilling operation, certain relay mechanism is set into operation by means of which a solenoid valve VS is actuated in such a manner as to supply air to the upper side of the cylinder 130 and thus drive the cylinder upwardly within the casing 116 to return the spindle 119 to its normally elevated position. Initial movement of the cylinder 130 and the spindle 119 downward at the commencement of any drilling stroke is also effected under the control of the solenoid valve VS which, for such purposes, is cause to admit air to the lower regions of the cylinder 130 under the control of the electrical instrumentalities associated with the present invention, all in a manner that will be set forth subsequently.

Various types of drill press units are capable of being used in connection with the present automatic drilling machine. One such unit which has been found suitable for use is known as the Dumore, Series 24 Automatic Drill Unit, manufactured and sold by Dumore Precision Tools Co., of Racine, Wisconsin.

Referring now to Figs. 1 and 9 wherein certain electrical sensing instrumentalities by means of which control of transverse shifting movement of the carriage 28 across the framework of the machine is best illustrated, a supporting bracket 150 is mounted on the support 24, is electrically connected thereto, and is adapted to removably receive thereon an electrical template or sensing plate 152 hereinafter referred to as the transverse feed template. The template 152 is in the form of an elongated flat plate formed of copper or other material having good electrical conductive qualities and the same is secured to the bracket 150 by means of anchoring screws 154. The plate 152 is provided with a series of upstanding sensing pins 156 arranged in a straight row extending transversely of the machine and the number of such pins correspond in number to the number of longitudinally extending, transversely arranged, rows of shear holes 14 provided in the various plates P undergoing drilling by the present machine as previously described. With the square checkerboard pattern of holes 14 provided in the plate P shown in Figs. 5 and 6, there are nine such diagonally extending, laterally spaced, rows of such holes. As a consequence the plate 152 is provided with nine of the sensing pins 156 and the distance between each pair of adjacent pins corresponds exactly to the distance between the adjacent transversely spaced rows in the plate P.

Still referring to Figs. 1 and 9, the universally movable carriage 36 has affixed thereto an L-shaped bracket 160 having a horizontal leg 162 overlying the template 152. The leg 162 is formed with a threaded hole 164 therethrough in which there is threadedly received a tubular sleeve 166 (see also Fig. 8) formed of a suitable insulating material. The sleeve 166 is formed with a socket 168 therein and a sensing pin 170 having a shank portion 172 and an enlarged head 174, extends through the bottom wall of the socket. A spring 176 disposed within the socket 168 bears at its lower end against the head 174 and at its upper end against the lower end of an adjusting screw 178 having a knurled head 180 and by means of which the tension applied to the sensing pin 170 may be regulated. The sleeve 166 is formed with a knurled head 182 by means of which the elevation of the entire sensing finger assembly may be adjusted relative to the various sensing pins 156. As shown in Fig. 8, the lower end of the sensing finger 172 and the upper ends of the various sensing pins 156 are tapered to substantial points as indicated at 184 and 186 respectively and the elevation of the sensing finger assembly is such that when the work supporting carriage 36 is brought to a position wherein the axis of the sensing finger 172 is in alignment with the axis of one of the sensing pins 186, the pin and finger meet and make electrical contact in end-to-end relationship.

Referring now to Figs. 1 and 7, a second L-shaped bracket 188 is secured by means of screws 190 to a plate 192 secured to the left hand side of the support 24 and is provided with a horizontally extending leg or platform portion 194. Suitably secured, as by screws 196 to the platform 194 is an electrical template or sensing plate 200, hereinafter referred to as the longitudinal feed template. The template 200 is similar to its construction to the transverse feed template 152 and it is provided with a series of upstanding sensing pins 202 arranged in longitudinally and transversely extending rows and disposed in a checkerboard pattern corresponding exactly to the checkerboard pattern of the holes 14 provided in the various plates P, both as regards the spacing of the longitudinal and transverse rows and as regards spacing between adjacent pins in each row. A generally U-shaped bracket 204 carries a sensing finger assembly 206 which may be substantially identical with the sensing finger assembly 169 and which, as a consequence, requires no detailed description. The assembly 206 is provided with a sensing finger proper 208 designed for cooperation with the various sensing pins 202 in the manner previously described in connection with the sensing pins 186 and sensing finger 172. The position of the longitudinal feed template 200 on the platform 188 is such that when the sensing finger 170 is in register with one of the sensing pins 156, the sensing finger 170 will be in longitudinal coincidence or alignment with one of the longitudinal rows of sensing pins 202.

Referring now to Figs. 1 and 2, a longitudinal bar 210 extends between the bracket 204 and 160 and has mounted thereon a pair of supporting blocks 212, between which blocks there extends a guide rod 214. A pair of limit switch assemblies SLF and STF (see also Fig. 10), hereinafter referred to as the longitudinal feed switch and the transverse feed switch respectively, are mounted on plates 216 secured to the side of the dovetail block 34 in spaced relationship and are provided with actuating fingers 218 and 220 respectively. The actuating fingers 218 and 220 are positioned in the respective paths of movement of a pair of longitudinally shiftable switch-operating blocks 222 and 224 respectively which are slidable on the rod 214 and which are capable of being anchored in any desired position of longitudinal adjustment therealong by means of set screws 226.

Briefly, in the operation of the automatic drilling machine of the present invention thus far described, the undrilled shear plate blanks P are positioned in the work supports 48 and are tightened in position by means of the clamping bolt 102. By electrical means subsequently to be described, the reversible motor MC is energized in a manner to bring the transverse carriage 28 to an initial or starting position wherein the sensing finger 170 makes electrical contact with the elevated land portion 158 of the cross feed template 152. Without regard to the electrical instrumentalities whereby the machine's movements are controlled, initial machine operations involve movement of the carriage 28 rearwardly of the machine so that the sensing finger 170 leaves the elevated land portion 158 and proceeds toward the first sensing pin 156 in the series of pins on the template 152. As soon as the sensing finger 170 engages the first sensing pin 156 in the series, the motor MC is deenergized so that further rearward movement of the carriage 28 is terminated. At this point in the machine cycle the longitudinal feed motor ML is energized whereupon the longitudinal carriage 28 will commence movement to the left as viewed in Fig. 1 along the dovetail guide block 34. It will be understood of course that prior to initial machine operations the carriage 36 will assume its extreme right hand position in the machine framework wherein the sensing finger 208 is positioned on the right side of the sensing pin 202 in the first longitudinal row of pins and in longitudinal alignment with such row. Movement of the carriage 36 to the left continues until such time as the sensing finger 208 engages the pin 202 in the first row and, at such time, the motor ML is deenergized to discontinue further longitudinal movement of the carriage 36. The sensing finger 208 remains momentarily in contact with the pin 202 and, at that time, the various rotating spindles 119 are driven downwardly under the influence of the pneumatic cylinder and piston assembly 124 in the cabinets 116. During such downward movement of the spindles 119, the drills 122 pass through the plates P and effect their drilling operations. After drilling operations are complete, the spindles 119 are bottomed and, under the influence of the micro switch MI they are immediately restored to their elevated positions whereupon the motor ML is again energized and the carriage 36 caused to proceed longitudinally of the machine to the left until such time as the block 224 carried on the rod 214 engages the switch STF. Actuation of the switch STF terminates the operation of the motor ML and causes energization of the motor MC in a direction to advance the carriage 28 rearwardly so that the sensing finger 170 leaves the first sensing pin 156 in the single row of pins and proceeds toward the second sensing pin in such row. Upon engagement of the sensing finger 170 with the second pin in the row of pins 156 the motor MC is deenergized to stop further rearward movement of the carriage 28 while the motor ML is energized in a reverse direction from the direction of its previous energization so that the longitudinally movable carriage 36 is now caused to proceed along the dovetail guide block 34 to the right as viewed in Fig. 1, thus bringing the sensing finger 208 into electrical engagement with the first sensing pin 202 in the second transverse row of pins at the left of the row. As soon as contact between the sensing finger 208 and sensing pin 202 is made, drilling operations are carried out as previously described and upon restoration of the various spindles 119 to their elevated positions, the motor ML is again energized and caused to move to the right until the second pin in the second transverse row of pins 202 is engaged by the sensing finger 208. Upon such engagement of the second pin 202 by the sensing finger 208 drilling operations are again effected and the carriage 36 moves to the right until such time as the block 222 engages the actuating finger 218 of the switch SLF whereupon movement of the carriage 36 is terminated and the carriage 28 is again caused to move rearwardly until such time as the sensing finger 170 moves into contact with the third sensing pin 156 in the single row of pins on the template 152. At this point a complete machine cycle involving an initial movement of the carriage 36 to the left as viewed in Fig. 1 with the sensing finger 208 sensing the first longitudinal row of pins 202 in the series, a movement of the carriage 28 rearwardly, and a movement of the carriage 36 to the right with the finger 208 sensing the second longitudinal row of pins 202 in the series is completed. This cycle of machine operations is repeated with the sensing finger 208 periodically traversing the succeeding longitudinal rows of pins 202, first to the left and then to the right, alternately, and with the sensing finger 170 controlling the necessary rearward movement of the carriage 28, until such time as the last pin in the rearmost row of pins 202 has been engaged by the sensing finger 208, at which time a switch SP is actuated and machine operations are terminated.

Figure 10:
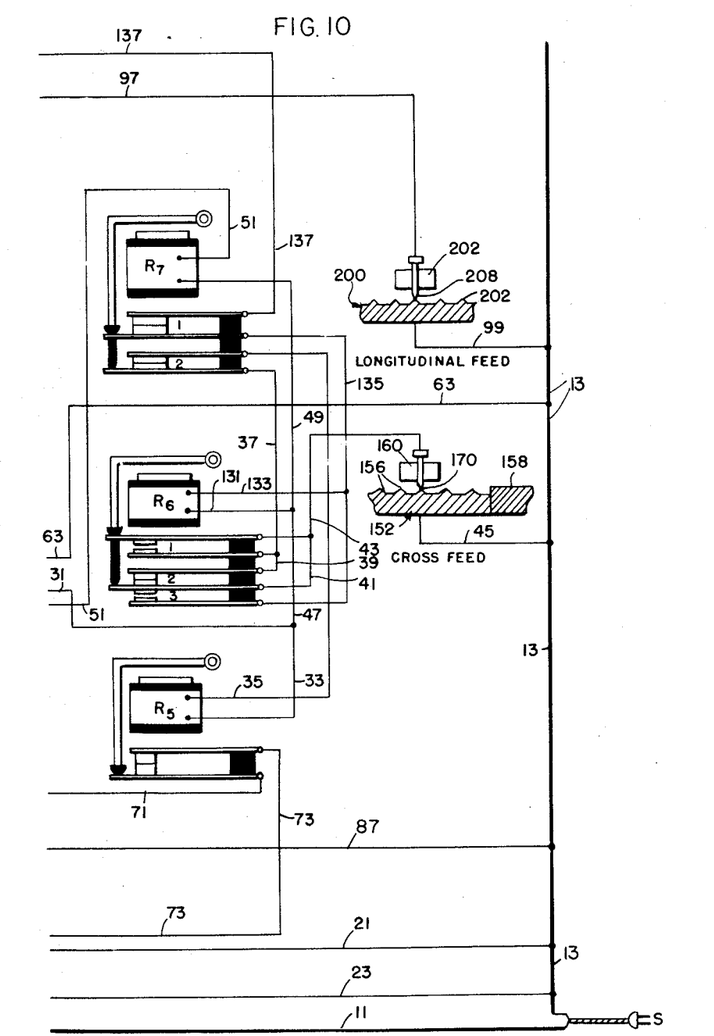
Figs. 10 and 11, when placed in edge-to-edge relationship, constitute an electric circuit diagram showing the operation of the various electrical control devices associated with the machine.
Figure 11:
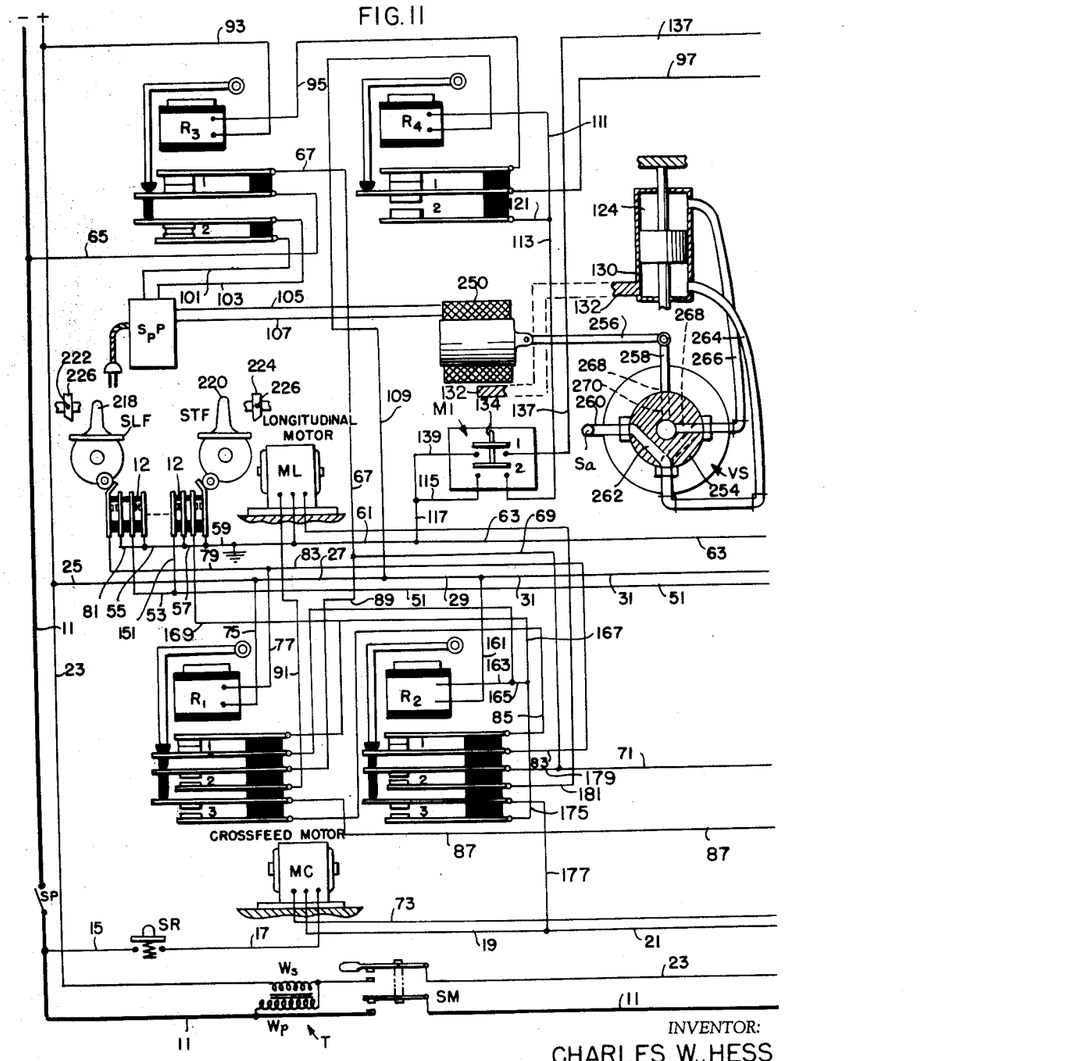

Referring now to Figs. 10 and 11 which, when placed in edge-to-edge relation, constitute an electrical circuit diagram for the present automatic drilling machine, it will be seen that current is supplied to the main lines 11 and 13 from a suitable source S which may be a commercial 110 volt, 60 cycle source, on closure of the main line or master switch SM. Upon closure of the switch SM current is made available for operation of the cross feed motor MC but is no yet made available for operation of the various other machine instrumentalities due to the presence of the manual shut-off switch SP which is interposed in the line 11 in series with the switch SM. The reversing switch SR for the cross feed motor MC is connected to the line 11 in advance of the switch SP so that it is possible to cause energization of the motor MC without necessitating closure of the shut-off switch SP. The reversing circuit for the motor MC extends from the source S, through line 11, lead 15, switch SR, lead 17, motor MC, leads 19, 21 and line 13 back to the source S. As previously explained, the circuit just described is employed for returning the transverse carriage 28 to its initial starting position.

The machine depends for its operational control upon a number of relay devices the nature of which will be set forth presently. These relay devices are, in turn, dependent for their operation upon a supply of low voltage current which may be obtained from a step-down transformer T, having a primary winding W$p$ and a secondary winding W$s$. The primary winding has its terminals connected to the line 11 and to a low voltage line 23 which utilizes the line 13 as its counterpart. The switch SM has one pole thereof interposed in the line 11 and the other pole thereof in the line 23. Upon closure of the switch SP, both high and low voltage current is made available for machine operation from the lines 11 and 23 respectively.

Immediately upon closure of the switch SP, a circuit will be established through a relay magnet R5 having a single pair of normally closed contacts associated therewith. This circuit extends from the line 23, through leads 25, 27, 29, 31, 33, magnet R5, lead 35, normally closed #2 contacts of relay magnet R7, leads 37, 39, normally closed #2 contacts of relay magnet R6, leads 41, 43, sensing finger 170, land portion 158 of the cross feed sensing plate 152, and lead 45 to the line 13. Energization of the magnet R5 will cause its normally closed pair of contacts to become open and further machine functioning will not take place until manual operation of the longitudinal feed switch SLF.

To effect initial movement of the carriage 28 rearwardly, the switch SLF is closed manually whereupon the normally open #1 and #2 contacts thereof will become closed, thus establishing a circuit through the relay magnet R7. This circuit extends from the line 23, through leads 25, 27, 29, 31, 47, 49, magnet R7, leads 51, 53, #2 contacts of the switch SLF, and leads 55, 57, 59, 61, 63, to the line 13. Energization of the magnet R7 will cause the previously mentioned normally closed #2 contacts thereof to become open, thus opening the previously described circuit through the relay magnet R5 and deenergizing the latter so as to cause closing of the contacts associated therewith.

The contacts of the magnet R5 are disposed in the circuit for the cross feed motor MC, this circuit extending from the high voltage line 11, through lead 65, normally closed #1 contacts of the relay magnet R3, leads 67, 69, 71, contacts of the magnet R5 (now closed), lead 73, motor MC, and leads 19, 21 to the line 13. With the motor MC thus energized, the sensing finger 170 moves off of the elevated land portion 158 of the sensing plate 152 and proceeds toward the first sensing pin 156 and, upon engagement with such pin, the magnet R5 is again energized through the previously described circuit extending through the #1 contacts of the magnet R3, the #2 contacts of the magnet R6 and the #2 contacts of the magnet R7, whereupon the circuit for the motor MC, previously described, will become open and the movement of the cross feed carriage 28 will be terminated.

Upon initial manual closure of the switch SLF, a circuit for the relay magnet R1 will be established, this circuit extending from the low voltage line 23, through leads 25, 75, magnet R1, leads 77, 79, #1 contacts of the switch SLF, and leads 81, 55, 57, 59, 61, 63 to the line 13. The #3 contacts of the magnet R1 constitutes a pair of holding contacts for this magnet, the holding circuit extending from the line 23, through leads 25, 75, magnet R1, leads 77, 83, normally closed #1 contacts of relay magnet R2, lead 85, #3 holding contacts of magnet R1 (now closed), and lead 87 to the line 13.

Energization of the magnet R1 as described above causes its #2 contacts to close, whereupon a circuit will exist through the longitudinal feed motor ML. This motor circuit extends from the high voltage line 11, through lead 65, normally closed #1 contacts of the magnet R3, and leads 67, 89, #2 contacts of the magnet R1 (now closed), lead 91, motor ML, and leads 61, 63 to the line 13. The motor ML will continue to run and the longitudinal carriage 36 will travel to the left as viewed in Fig. 1 until such time as the sensing finger 208 engages the first pin 202 in the first transverse row of pins on the longitudinal sensing plate 200. At this time, a circuit will be established from the low voltage line 23, through lead 93, magnet R3, lead 95, normally closed #1 contact of the magnet R4, lead 97, sensing finger 208, sensing pin 202 and lead 99 to the line 13. Energization of the magnet R3 will cause the #1 contacts to open, thus deenergizing the previously described circuit through the motor ML and causing the longitudinally moving carriage 36 to terminate its movement. At this instant in the machine cycle, the position of the various work supports 48 will be such that the plates P carried thereby will be in proper position for drilling operations to create the first holes 14 therein.

Drilling operations are initiated by closure of the normally open #2 contacts of the magnet R3 at its time of energization as described above. These contacts are connected through leads 101 and 103 to a relay control device SpR, hereinafter referred to as the spindle relay, by means of which the winding 250 of the spindle solenoid valve VS is energized. The details of the relay device SpR have not been illustrated herein inasmuch as the device constitutes an element of the commercially available automatic drill unit identified above. It is deemed sufficient to state herein that upon closure of the #2 contacts of the magnet R3, the solenoid valve winding 250 is energized through the output leads 105 and 107 and, by means of the valve VS, air is supplied under pressure to the lower end of the movable cylinder 130 so that the latter will be driven downwardly to actuate the drill 122.

The solenoid valve VS is likewise a part of the commercially available drill unit and a schematic representation of its operation has been made in Fig. 10. Upon energization of the winding 250, the solenoid core 252 is moved in a direction to shift the valve core 254, through the medium of the link 256 and operating arm 258, and thus establish a pneumatic circuit extending from a source Sa of air under pressure, through conduit 260, valve core passage 262, and conduit 264 to the lower end of the cylinder 130. Air is exhausted from the upper end of the cylinder 130 through conduit 266 and passage 268 to the atmosphere.

After the various holes 14 have been formed in the plates P, the arm 132 engages the operating finger 134 of the microswitch M1 and closes the #1 and #2 contacts thereof. Closure of the #2 contacts causes energization of the relay magnet R4, the circuit extending from the low voltage line 23, through leads 25, 27, 109, magnet R4, leads 111, 113, #2 contacts of switch M1, and leads 115, 117, 63 to the line 13.

Energization of the magnet R4 causes opening of its normally closed #1 contacts and, upon opening of these contacts, the previously described circuit through the magnet R3 is broken, thus deenergizing the magnet R3 and causing the #2 contacts thereof to open and actuate the relay device SpR and deenergize the spindle winding 250. Deenergization of the winding 250 will return the valve core 254 to its normal position whereupon a pneumatic circuit will exist from the source Sa of air under pressure, through conduit 260, passage 270 and conduit 266 to the upper end of the cylinder 130, thus driving the cylinder upwardly and retracting the various spindles 119 and drills 122.

Deenergization of the magnet R3 causes the #1 contacts thereof to close, thus establishing the previously described circuit through the motor ML and causing the carriage 36 to again proceed in its path of travel to the left as viewed in Fig. 1 so that the sensing finger 208 leaves the pin 202 and, due to the previously described holding circuit for the previously energized magnet R1, the motor ML will continue to run until such time as any succeeding pin 202 in the longitudinal row of such pins is engaged, whereupon the magnet R3 will again become energized through the previously described circuit extending through the sensing finger 208. Ordinarily the sequence of operations thus far decribed involving periodic deenergization of the motor LM upon contact of the finger 208, subsequent drilling operations, and reenergization of the motor LM will take place repetitiously as long as there remain pins 202 in the longitudinal row undergoing sensing. However, according to the pattern selected for illustration, the sensing plate 200 contains only one pin 202 in the first row thereof so that, after this pin has been sensed as described above, further longitudinal movement of the carriage 36 to the left will allow the carriage to run out to the limit of its extent of movement whereupon the block 224 will engage the switch STF and close the #1 and #2 contacts thereof.

Energization of the magnet R4 under the influence of the microswitch M1 also closes the #2 holding contacts thereof so that the magnet is maintained energized as long as the sensing finger 208 remains in contact with the sensing pin 202. This holding circuit extends from the line 23, through leads 25, 27, 109, magnet R4, leads 111, 121, #2 holding contacts of magnet R4, lead 97, sensing finger 208, pin 202 and lead 99 to the line 13. This holding circuit will remain in effect until such time as the sensing finger 208 moves away from the pin 202, at which time the circuit is broken and the magnet R4 is deenergized.

Closure of the #1 contacts of the switch STF will cause energization of the relay magnet R7 through a circuit extending from the line 23, through leads 25, 27, 29, 31, 47, 49, magnet R7, leads 51, 151, #1 contacts of switch STF and leads 57, 59, 61, 63 to the line 13. Energization of the magnet R7 will, as previously described cause opening of its #2 contacts, thus deenergizing the relay magnet R5 and closing the contacts thereof to again cause transverse movement of the carriage 28. The sensing finger 168 will move from the first pin 156 in the series and proceed to the second such finger whereupon the previously described circuit through the sensing finger 168 and magnet R5 will become effective to terminate further transverse feed of the carriage.

Closure of the #2 contacts of the switch STF effects energization of the magnet R2 through a circuit extending from the line 23 through leads 25, 27, 29, 161, magnet R2, leads 163, 165, 167, 169, #2 contacts of switch STR, and leads 59, 61 and 63 to the line 13. A holding circuit for the magnet R2 extends from the line 23 through leads 25, 27, 29, 161, magnet R1, leads 163, 165, 175, #3 contacts of magnet R2, leads 177 and 21 to the line 13. Opening of the #1 contacts of the magnet R2 breaks the previously described holding circuit for the magnet R1.

Closure of the #2 contacts of the magnet R2 establishes a circuit through the longitudinal fed motor LM which now operates in a reverse direction to move the longitudinal fed carriage 36 to the right as viewed in Fig. 1. This motor circuit extends from the high voltage line 11 through lead 65, #1 contacts of the magnet R3 (now closed), leads 67, 69, 179, #2 contacts of the magnet R2, lead 181, motor ML, and leads 61 and 63 to the line 13.

The carriage 36 now moving to the right as viewed in Fig. 1 will continue to move until such time as the first pin 202 in the second longitudinal row of pins on the plate 200 is encountered by the sensing finger, at which time the previously described circuit through the sensing finger and magnet R3 is again established. The motor LM is thus deenergized and further movement of the carriage 36 terminates. The previously described sequence of operations involving traversing of the first row of pins is repeated with the magnet R2 instead of the magnet R1 controlling the reverse direction of the motor LM. After the extreme right hand pin 102 has effected its function, the carriage 36 moves to the right until the block 212 engages the switch SLF whereupon rearward motion of the transverse carriage 28 is again initiated thus commencing a second machine cycle.

The operation of the machine is continuous with the sensing finger 208 sensing the pins 202 in each succeeding longitudinal row in a different direction and with the sensing finger 170 sensing the various pins 156 successively from front to rear. After the last pin 202 in the rearmost longitudinal rows of pins has been sensed by the sensing finger 208, an abutment 270 on the machine carriage 28 will engage switch SP and open the same whereupon the cross feed motor MC will be disabled. Prior to the next machine set-up, the switch SR will be depressed as previously described to return the carriage 36 to its extreme forward position.

Having thus described the invention what I claim as new and desire to secure by Letters Patent is:

1. In an automatic drilling machine for drilling a row of predeterminedly spaced aligned holes in a workpiece, a positionable work-supporting table, a fixed drill unit above said table and including a continuously rotatable vertically disposed drill movable axially between an elevated position wherein the lower end thereof clears a workpiece on the table and a lowered position wherein the lower end thereof engages the workpiece for drilling purposes, means for effecting raising and lowering movement of said drill, a fixed pattern plate including a row of aligned contacts which are spaced conformably to the predetermined spacing of said aligned holes, means for guiding said table for movement in a path parallel to the direction of alignment of said row of contacts, a sensing finger mounted on and movable bodily with said table and designed for successive electrical engagement with said contacts upon movement of the table in said path in one direction, a normally energized electric motor operable when energized to move the table in said one direction, and relay actuated means operable upon electrical contact between said sensing finger and each of said contacts, firstly, to deenergize said motor to terminate movement of the table, secondly, to effect movement of the drill from its elevated to its lowered position and return of the drill to its elevated position, and thirdly, to again energize said motor and thus cause resumption of the movement of said table in said one direction.

2. In an automatic drilling machine for drilling a row of predeterminedly spaced aligned holes in a workpiece, a positionable work-supporting table, a fixed drill unit above said table and including a continuously rotatable vertically disposed drill movable axially between an elevated position wherein the lower end thereof clears a workpiece on said table and a lowered position wherein the lower end thereof engages the workpiece for drilling purposes, first energizable relay means operable upon energization thereof to effect movement of the drill downwardly and to thereafter restore the drill to its elevated position, a fixed pattern plate including a row of aligned contacts which are spaced conformably to the predetermined spacing of said aligned holes, means for guiding said table for movement in a path parallel to the direction of alignment of said row of contacts, a sensing finger mounted on and bodily movable with said table and designed for successive electrical engagement with said contacts upon movement of the table in said path in one direction, a normally energized electric motor operable when energized to move said table in said one direction, second energizable relay means operable when energized for causing deenergization of said motor, means operable upon engagement of said sensing finger with one of said contacts for energizing said first and second relay means, and means operable upon movement of said drill to its lowered position for deenergizing said second relay means to thus allow said normally energized motor to again become energized.

3. In a machine for automatically drilling parallel rows of predeterminedly spaced aligned holes in a workpiece, in combination, a positionable work-supporting table capable of transverse increments of movement and capable of longitudinal increments of movement between two extreme positions, a fixed drill unit above said table and including a continuously rotatable vertically disposed drill movable axially between an elevated position wherein the lower end thereof clears a workpiece on the table and a lowered position wherein the lower end thereof engages the workpiece for drilling purposes, control means for effecting raising and lowering movements of the drill, a first fixed pattern plate including a row of aligned contacts which are spaced conformably to the spacing between said parallel rows of aligned holes, a second fixed pattern plate including a plurality of parallel rows of contacts, said rows of contacts being spaced conformably to the spacing between said parallel rows of aligned holes and the spacing of the contacts in the individual rows of contacts being conformable to the predetermined spacing of the holes in the respective parallel rows of holes, a first sensing finger for said first fixed pattern plate, means constraining said sensing finger to move in conformity to the increments of transverse movement of said table for traverse of the row of contacts of said first pattern plate, a second sensing finger for said second fixed pattern plate, means constraining said second sensing finger to move bodily with the table for traverse of the contacts of each row of contacts of the second pattern plate, a normally deenergized cross feed motor operable when energized to move the table in one transverse direction, a normally energized reversible longitudinal feed motor operable when energized to move the table in longitudinal directions, selectively operable means for conditioning said motor for operation in opposite directions, means operable upon electrical contact between said first sensing finger and each of the contacts of said first pattern plate for deenergizing said cross feed motor, means operable upon electrical contact between said second sensing finger and each of the contacts of said second pattern plate to deenergize said longitudinal feed motor and to actuate said drill control means, means operable upon movement of the drill to its lowered position to again energize said longitudinal feed motor, and means operable upon movement of the table to either of its extreme positions for actuating said motor reversing conditioning means.

4. In a machine for automatically drilling parallel rows of predeterminedly spaced aligned holes in a workpiece, the combination set forth in claim 3 including, additionally, means operable after said first sensing finger has traversed the last contact in the row of contacts of said first pattern plate for deenergizing said longitudinal feed and cross feed motors simultaneously.

5. In a machine for automatically drilling parallel rows of predeterminedly spaced aligned holes in a workpiece, the combination set forth in claim 3 wherein said cross feed motor and said longitudinal feed motors are each provided with a normally closed motor circuit, said circuits for the motors being disposed in parallel relationship across a power line, and including, additionally, a limit switch common to said motor circuits, and an actuating finger for said switch positioned in the path of transverse movement of said table and engageable with the table after the first sensing finger has traversed the last contact in the row of contacts of said first pattern plate for opening said motor circuits.

6. In a machine for automatically drilling parallel rows of predeterminedly spaced aligned holes in a workpiece, the combination set forth in claim 5 wherein said cross feed motor is reversible, and including, additionally, a manually operable reversing switch disposed in said cross feed motor circuit in shunt relation relative to said limit switch.

7. In an automatic drilling machine for drilling parallel rows of predeterminedly spaced aligned holes in a workpiece, in combination, a stationary machine framework including means establishing a transversely extending guideway, a transverse feed carriage slidable in said guideway, means on said carriage and movable bodily therewith establishing a longitudinally extending guideway, a longitudinal feed carriage slidable in said latter guideway between two extreme positions, a horizontally disposed work support on said longitudinal feed carriage and movable bodily therewith, a reversible cross feed motor for said transverse feed carriage, means operatively connecting said motor and transverse feed carriage in driving relationship, a reversible longitudinal feed motor for said longitudinal feed carriage, a normally closed circuit for each motor, means operatively connecting said longitudinal feed motor and longitudinal feed carriage in driving relationship, a fixed drill unit above said work support and including a rotatable drill movable between raised and lowered positions and operable during downward movement thereof to engage a workpiece carried in said support, means controlling the operation of said drill unit, a first fixed pattern plate including a row of aligned contacts which are spaced conformably to the spacing between said parallel rows of aligned holes, a second fixed pattern plate including a plurality of rows of contacts, said rows of contacts being spaced conformably to the spacing between said parallel rows of aligned holes in the spacing of the contacts in the individual rows of contacts being conformable to the predetermined spacing of the holes in the respective parallel rows of holes, a first sensing finger mounted on and bodily movable with said transverse feed carriage and engageable with the contacts of said first pattern plate, a second sensing finger mounted on and bodily movable with said longitudinal feed carriage and engageable with the contacts of said second pattern plate, selectively operable means for conditioning said longitudinal feed motor for operation in opposite directions, means operable upon contact of said first sensing finger with each of the contacts of said first pattern plate for opening said cross feed motor circuit, means operable upon contact of said second sensing finger with each of the contacts of said second pattern plate for opening said longitudinal feed motor circuit and for actuating said drill control means, means operable upon movement of said drill to its lowered position for closing said longitudinal feed motor circuit, and means operable upon movement of the longitudinal feed carriage to either of its extreme positions for actuating said motor reversing conditioning means.

8. In a machine for automatically drilling parallel rows of predeterminedly spaced aligned holes in a workpiece, the combination set forth in claim 7 including, additionally, means operable after said first sensing finger has traversed the last contact in the row of contacts of said first pattern plate for opening said longitudinal feed and cross feed motor circuits simultaneously.

9. In a machine for automatically drilling parallel rows of predeterminedly spaced aligned holes in a workpiece, the combination set forth in claim 8 wherein said last mentioned deenergizing means comprises a fixed limit switch on said framework and common to said motor circuits, and an actuating finger for said switch movable bodily with said transverse feed carriage and engageable with said limit switch after the first sensing finger has traversed the last contact in the row of contacts of said first pattern plate for opening said motor circuits.

10. In a machine for automatically drilling parallel rows of predeterminedly spaced aligned holes in a workpiece, the combination set forth in claim 9 including, additionally, a manually operable reversing switch disposed in said cross feed motor circuit in shunt relation to said limit switch.

11. In an automatic drilling machine for successively drilling a series of holes at points which are predeterminedly spaced in longitudinal rows in a workpiece, in combination, a stationary machine framework including means establishing a transversely extending guideway, a transverse feed carriage slidable in said guideway, means on said carriage and movable bodily therewith establishing a longitudinally extending guideway, a longitudinal feed carriage slidable in said latter guideway between two extreme positions, a horizontally disposed work support on said longitudinal feed carriage and movable bodily therewith, energizable cross feed means for moving said transverse feed carriage, energizable longitudinal feed means for moving said longitudinal feed carriage, a work support mounted on said longitudinal feed carriage, a fixed drill unit above said work support and including a rotatable drill designed for vertical register with said points and movable between raised and lowered positions and operable during downward movement thereof to engage a workpiece on the work support, energizable means for actuating said drill unit, means for sensing which row in the workpiece is in register with said drill, said sensing means comprising a pattern plate having electrical contacts thereon arranged in alignment in a row extending transversely of the framework and a sensing finger mounted on said transverse feed carriage and engageable with said contacts, means controlled by said sensing means for controlling the operation of said energizable cross feed means to terminate the movement of said transverse feed carriage so as to maintain said row in vertical register with said drill, and additional means for sensing which point in such row is in vertical register with said drill, said additional sensing means comprising a pattern plate having electrical contacts thereon arranged conformably to said predeterminedly spaced longitudinal rows of points in the workpiece and a sensing finger engageable with said latter contacts, and means controlled by said additional sensing means for controlling the operation of said energizable drill-actuating means.

References Cited in the file of this patent
UNITED STATES PATENTS

| 805,192 | Gadd et al. | Nov. 21, 1905 |

FOREIGN PATENTS

| 281,777 | Great Britain | Dec. 12, 1927 |
| 766,788 | Great Britain | Jan. 23, 1957 |